3,105,738
CHEMICAL RECOVERY OF WASTE LIQUORS
Salvatore A. Guerrieri, Scarsdale, and Murray Wolf, Jamaica, N.Y., assignors to The Lummus Company, New York, N.Y., a corporation of Delaware
Filed June 25, 1958, Ser. No. 744,583
4 Claims. (Cl. 23—131)

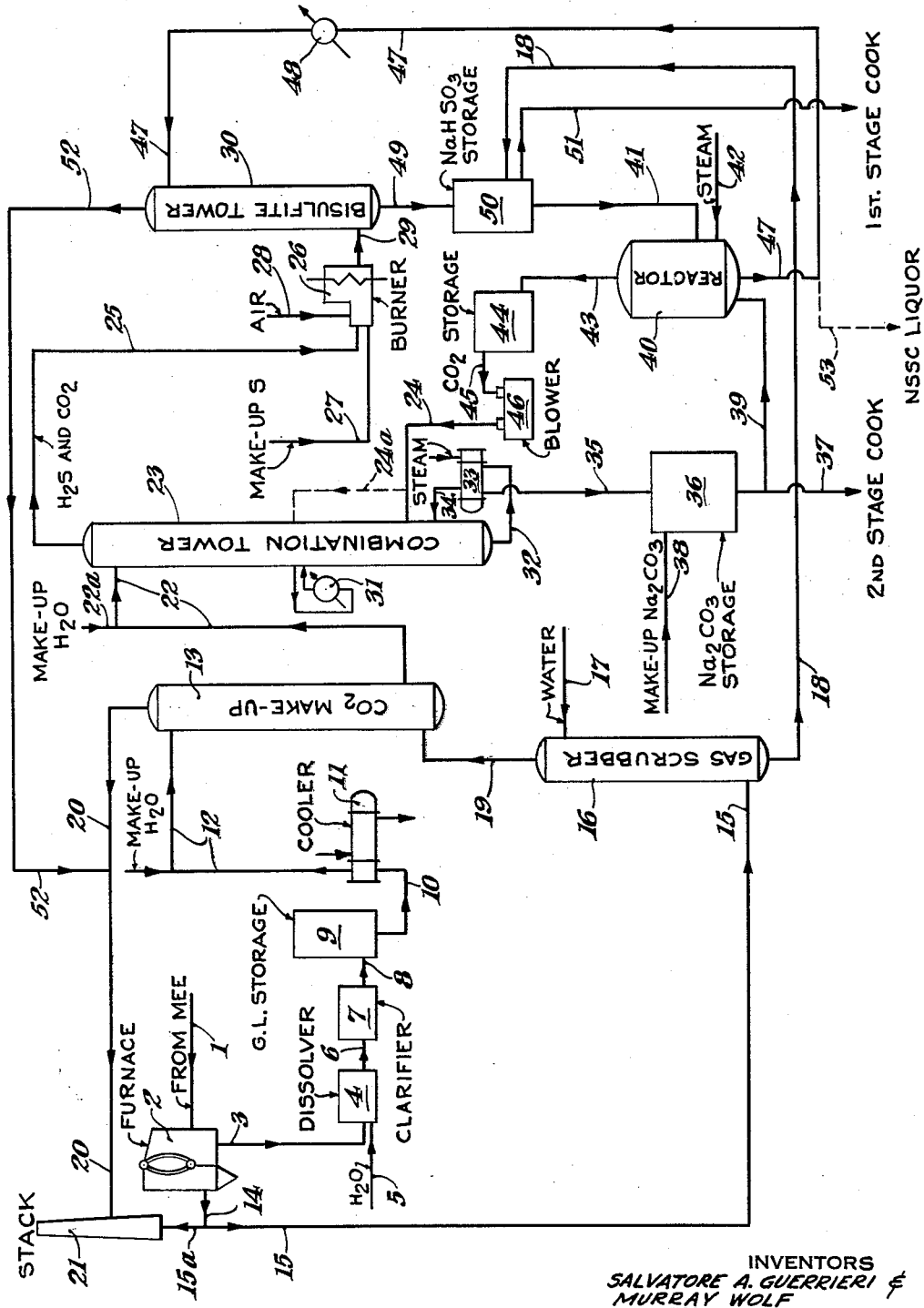

This invention relates to the treatment of residual chemical liquor recovered from the delignification of cellulosic material by a sulfite cooking liquor and more particularly to an improved process for treating a sodium base waste sulfite liquor to recover the sodium and sulfur content therein and to regenerate the sodium base carbonate and sulfite compounds for reuse in subsequent delignifying cycles.

It is well known that most paper and paper products are manufactured from wood and/or other cellulosic materials which have been converted into pulp. Pulp may be prepared by several processes including mechanical, chemical and semichemical processes. Mechanical processes are based upon the physical reduction of cellulosic material to a fibrous state whereas the chemical processes, such as the acid sulfite, sulfate and soda processes, are based upon the chemical removal of the ligneous compounds contained in the cellulosic material. While chemical and mechanical processes have been widely utilized, it has only been in recent years that semichemical processes have achieved substantial importance, even though such processes have a substantially higher pulp yield. Semichemical processes comprise reacting the cellulosic material with a chemical liquor to partially remove the ligneous compounds and thereafter subjecting the partially delignified cellulosic material to a mechanical process to complete fiberization.

Formerly, acid sulfite delignification exclusively utilized calcium bisulfite in aqueous solution with or without an excess of sulfurous acid as the cooking liquor. The waste or spent liquor obtained from such process has in the past been disposed of by emptying such liquor into a nearby stream or body of water, thereby creating serious pollution problems. Considerable effort has been directed toward the development of methods for full and economical recovery of the residual liquor.

One of the main objectives of prior attempts for spent liquor utilization, apart from pollution prevention, has been the utilization of the heat value of resulting organic base compounds by burning such liquor. The recovery of the calcium content from spent liquor has been of secondary interest since the calcium content has little economic value and recovery of the original calcium base chemicals from the smelted waste liquor is impractical due to calcium sulfate formation during smelting. The use of more soluble base chemicals in the cooking liquor, such as sodium sulfite or sodium bisulfite, has partially replaced calcium base cooking liquor and has resulted in a pulp of higher brightness in unbleached form and a delignification cycle of shorter duration as compared with the use of the more insoluble calcium base chemicals. Sodium base chemicals, however, have a substantially higher relative cost, and consequently, serious efforts have gone into developing a satisfactory recovery system to regenerate the sodium compounds for reuse in the delignifying liquor and to utilize the heat content of the organic compounds placed in solution during delignification. An economical recovery system for the sodium base chemicals is further necessitated by the fact that the advantages derived from the utilization of such chemicals are not so outstanding as to transcend the smaller cost of calcium base chemicals. This is borne out by the substantial number of pulping plants which have retained the latter chemicals in the delignifying liquor.

A residual waste liquor from a sodium sulfite or sodium bisulfite delignification contains sulfur dioxide bearing compounds of sodium, principally as ligno-sulfonic compounds or other organic sulfonic compounds formed by the action of the cooking liquor on the organic substances present in the ligneous cellulosic material, together with some residual sulfite compound or compounds. It also contains other organic compounds derived from the cellulosic material or formed by the action of the cooking liquor on constituents of such material including, for example, sugars or other carbohydrates, and various organic acids, such as formic or acetic acid or the salts thereof.

The present invention is applicable to the treatment of residual liquor obtained from delignifying processes utilizing various types of sodium base sulfite chemicals such as: the sodium base acid sulfite processes, in which the cooking liquor contains sodium acid sulfite ($NaHSO_3$) and generally free sulfurous acid, whereas the residual liquor contains some sodium acid sulfite together with ligno-sulfonic compounds and other organic compounds as mentioned hereinbefore; and the neutral sodium base sulfite processes in which the cooking liquor contains sodium sulfite ($Na_2SO_3$) and one or more alkaline compounds of sodium such as, sodium bicarbonate and/or sodium carbonate, whereas the residual liquor contains sodium sulfite with some of the other alkaline sodium compounds together with ligno-sulfonic compounds and other organic compounds as mentioned hereinbefore.

It is generally known that the smelt obtained from the combustion of a concentrated waste sulfite liquor contains substantial quantities of sodium sulfide which should be converted if the smelt is to be treated to regenerate a sodium sulfite cooking liquor. This conversion step should be performed in such manner as to minimize undesirable sodium compounds, such as sodium thiosulfate and sodium polysulfides which may be formed in the presence of residual sodium sulfide. Sodium thiosulfate and polysulfides cause great difficulties in subsequent digestion cycles, even though present in relatively small amounts, since sodium sulfide, sodium thiosulfate and sodium polysulfides in the presence of sulfur dioxide form free sulfur which has a deleterious effect on a pulp product obtained from an acid delignification, particularly in subsequent bleaching operations.

It is a principal object of our invention to provide, in a two stage acid-alkali or in a single stage neutral sulfite semichemical delignification of cellulosic material, an efficient and economical means for recovering chemicals and heat by substantially complete utilization of residual delignifying liquor in a form permitting the reuse of the chemicals for subsequent delignification.

Another object of the invention is to provide, in a two stage acid-alkali or in a single stage neutral sulfite semichemical delignification of cellulosic material, an improved means for economical make-up and recovery of carbon dioxide from the furnace products of waste liquor combustion.

A further object of the invention is the provision in a two stage acid-alkali or in a single stage neutral sulfite semi-chemical delignification of cellulosic material, improved means for economical make-up of carbon dioxide from the furnace products of waste liquor combustion whereby the formation of sodium thiosulfate is substantially eliminated.

Other objects and a fuller understanding of the invention may be had by referring to the following description taken in conjunction with the accompanying drawing, in which the FIGURE is a schematic flow diagram illustrating a preferred embodiment of our invention for substantially complete recovery of sodium base chemicals and heat from the waste liquor of a two stage acid-alkali or of a single stage neutral sulfite semichemical delignification.

We propose to make up carbon dioxide losses in the system by contacting scrubbed furnace off-gas with green liquor under conditions of temperature and pressure whereby a portion of the sodium carbonate content of the green liquor is converted to sodium bicarbonate and a portion of the sodium hydroxide, formed by the hydrolysis of the sodium sulfide in the green liquor (as described hereinafter), is converted to sodium carbonate without substantial formation of gaseous hydrogen sulfide. The partially carbonated green liquor is thereafter passed through a second contact in a second tower with relatively pure carbon dioxide under conditions whereby the sodium sulfide content of the green liquor is substantially converted to sodium carbonate, sodium bicarbonate and hydrogen sulfide. Substantially all of the sodium bicarbonate content of the resulting solution, as determined by the equilibrium constant for the sodium carbonate-sodium bicarbonate system, is decomposed in the lower portion of the second tower to form sodium carbonate and carbon dioxide. Substantially no sodium bicarbonate crystals are formed during the second carbonation step. The carbon dioxide produced by the decomposition of the sodium bicarbonate constitutes a portion of the relatively pure carbon dioxide contacting the green liquor in the upper portion of the second tower, and the sodium carbonate solution withdrawn from the second tower may be utilized as a second stage cooking liquor and as one of the reactant solutions in the preparation of an acid cooking liquor as hereinafter described. The off-gas from the second tower including hydrogen sulfide is sent to a sulfur recovery unit to recover the sulfur content thereof.

A sodium bisulfite solution, which may be a first stage acid cooking liquor, is prepared by passing a sodium sulfite solution in countercurrent contact relation to sulfur dioxide obtained from a sulfur burner of the sulfur recovery unit. The sodium sulfite solution used for this step may be obtained by reacting a sodium carbonate solution with a portion of the sodium bisulfite solution. A product of the latter conversion is carbon dioxide which may constitute a portion of the relatively pure carbon dioxide introduced into the second tower for contact with the partially carbonated green liquor.

Referring to the drawing, which illustrates a preferred method of continuously regenerating spent sulfite liquor in accordance with our invention, spent sulfite liquor which may be concentrated in multi-effect evaporators (not shown), passes through line 1 to furnace 2 wherein it is burned to produce a smelt primarily comprising sodium sulfide and sodium carbonate and an off-gas primarily comprising carbon dioxide, nitrogen, oxygen and sulfur dioxide. The smelt leaves furnace 2 in line 3 and passes into dissolver 4 wherein sufficient water entering through line 5 dissolves the sodium salts content of the smelt and forms green liquor. The green liquor leaving dissolver 4 in line 6 passes into clarifier 7 and thence through line 8 into green liquor storage tank 9. The green liquor leaving storage tank 9 through line 10 is cooled in cooler 11 and is introduced through line 12 into $CO_2$ make-up tower 13.

The off-gas leaving furnace 2 through line 14 provides a source of carbon dioxide make-up for losses within the system. Such furnace gas as is required for carbon dioxide make-up is passed through line 15 to gas scrubber 16 wherein the off-gas is passed in countercurrent contact relation to water introduced through line 17 to absorb the sulfur dioxide content of said off-gas. The $SO_2$ enriched solution leaves tower 16 through line 18 and the scrubbed furnace off-gas, primarily comprising carbon dioxide, oxygen and nitrogen, leaves through line 19.

The scrubbed furnace off-gas is introduced into tower 13 and is passed in countercurrent contact relation to the green liquor in line 12 so as to absorb the carbon dioxide from the scrubbed furnace off-gas according to Equations 1, 2 and 3 below, and under conditions whereby negligible amounts of hydrogen sulfide are formed according to Equation 4.

(1) $Na_2S + H_2O = NaOH + NaHS$
(2) $2NaOH + CO_2 = Na_2CO_3 + H_2O$
(3) $Na_2CO_3 + CO_2 + H_2O = 2NaHCO_3$
(4) $2NaHS + CO_2 + H_2O = Na_2CO_3 + H_2S$

The off-gas leaving tower 13 through line 20 passes to stack 21 wherein such gas and any excess off-gas leaving the furnace 2 through lines 14 and 15a, respectively, are vented to the atmosphere. In this manner carbon dioxide may be conveniently and economically returned to the process under conditions which substantially eliminate the formation of deleterious sodium thiosulfate and the like. The partially carbonated green liquor leaves tower 13 through line 22 and is introduced into the upper portion of a combination tower 23. The green liquor passes downwardly through tower 23 in countercurrent contact relation with substantially pure carbon dioxide introduced to the tower through line 24 and simultaneously produced by the decomposition of sodium bicarbonate as described hereinafter. If desired relatively pure carbon dioxide may be alternately or in part fed to tower 23 through line 24a. The sodium sulfide, sodium hydroxide and sodium hydrosulfide contents of the green liquor flowing through the tower 23 are substantially converted to sodium carbonate and bicarbonate according to Equations 1, 2, 3 and 4. The temperature and pressure of tower 23 are maintained so as to substantially prevent the formation of sodium bicarbonate crystals therein. Additional water may be added to the partially carbonated green liquor in line 22 through line 22a to control bicarbonate concentration in tower 23 so as to minimize the formation of sodium bicarbonate crystals. The hydrogen sulfide formed according to Equation 4 leaves tower 23 as overhead in line 25 and passes to hydrogen sulfide-sulfur burner 26 wherein such hydrogen sulfide and make-up sulfur introduced through line 27 are burned in the presence of air (supplied through line 28) to form sulfur dioxide. The sulfur dioxide leaves burner 26 in line 29 and passes to bisulfite tower 30 wherein it is absorbed as described hereinafter.

The sodium carbonate and bicarbonate solution, formed in tower 23, may be cooled in intercooler 31 during passage downwardly through such tower to remove a portion of the heat introduced to the lower portion of the tower (as hereinafter described), thereby establishing a temperature gradient within the tower to provide for improved absorption of carbon dioxide and conversion of the sulfides to carbonates. The sodium carbonate and bicarbonate solution is heated in the lower reboiled section of the tower 23 to decompose the sodium bicarbonate content thereof according to Equation 5.

(5) $NaHCO_3 = Na_2CO_3 + H_2O + CO_2$

The carbon dioxide formed during the decomposition in tower 23 constitutes a portion of the relatively pure carbon dioxide passing through such tower. Tower bottoms 32 are passed to reboiler 33 and are heated in the reboiler by steam to concentrate the sodium carbonate and bicarbonate solution and to provide heated vapors which enter the lower portion of the tower through line 34 and which supply the heat for decomposition. The concentrated sodium carbonate and bicarbonate solution in reboiler 33 is withdrawn from reboiler 33 through line 35 and is passed to sodium carbonate storage tank 36, from which second stage cooking liquor may be withdrawn through line 37. Additional sodium carbonate may be added to storage tank 36 through line 38 to make up for soda losses within the system.

A portion of the sodium carbonate solution in storage tank 36 is passed through line 39 to reactor 40, wherein it is contacted with a sodium bisulfite solution entering such reactor through line 41. The resultant solution is heated by steam entering reactor 40 through line 42 and reacts according to Equation 6, to form gaseous carbon dioxide and a solution primarily comprised of sodium sulfite.

(6) $Na_2CO_3 + 2NaHSO_3 = 2Na_2SO_3 + CO_2 + H_2O$

The carbon dioxide is sent via line 43 to carbon dioxide storage tank 44 wherefrom the carbon dioxide is withdrawn through line 45, blower 46 and line 24 and/or 24a to provide relatively pure carbon dioxide for reaction in tower 23. The sodium sulfite solution leaving reactor 40 through line 47 is cooled in heat exchanger 48 and enters the upper portion of bisulfite tower 30 wherein the solution passes in countercurrent contact relation to sulfur dioxide admitted to the lower portion of such tower through line 29. The sulfur dioxide is absorbed in tower 30 by the sodium sulfite solution according to Equation 7 below. A sodium bisulfite solution is formed which leaves tower 30 through line 49, and enters storage tank 50.

(7) $Na_2SO_3 + SO_2 + H_2O = 2NaHSO_3$

The sulfur dioxide enriched gas scrubber bottoms 18 enters storage tank 50 and mixes with the sodium bisulfite solution therein. The sodium bisulfite solution in storage tank 50 constitutes first stage cooking liquors and may be withdrawn through line 51. A portion of the sodium bisulfite solution in storage tank 50 is passed to the reactor 40 through line 41, as described hereinbefore, for preparing the sodium sulfite solution (line 47) utilized for absorbing sulfur dioxide in tower 30. The off-gas leaving tower 30 through line 52 primarily comprises carbon dioxide and nitrogen which are passed through lines 52 and 20, respectively, to stack 21 wherein they are vented to the atmosphere.

Table I is an illustration of the operating requirements of the process route depicted in the drawing for recovering the sodium and sulfur content of a sodium base waste sulfite liquor.

TABLE I
Summary of Operating Conditions

| Designation | Pressure Top, p.s.i.g. | Temperature Top, °F. | Temperature Bottom, °F. |
|---|---|---|---|
| Gas Scrubber (16) | | 95–120 | 100–130 |
| CO₂ Make-Up (13) | 0–5 | 90–120 | 110–140 |
| Combination Tower (23) | 5–15 | 90–140 | 220–270 |
| Bisulfite Tower (30) | 0–5 | 100–120 | 110–130 |
| Reactor (40) | 0–5 | 180–210 | 170–210 |

The process as hereinbefore described may be modified to include the preparation of neutral sulfite semichemical cooking liquor by passing the sodium carbonate solution in storage tank 36 through line 39 and sodium sulfite solution in storage tank 50 through line 41 to reactor 40 and using substantially all of the resultant sodium sulfite solution, less requirements for bisulfite tower 30, as such cooking liquor through lines 47 and 53.

A preferred embodiment of our process is illustrated by reference to the following example of operating data read in conjunction with the accompanying drawing. With the principal processing units operating under the conditions set forth in Table II below, 5400 pounds per hour of smelt, comprising 3000 pounds of $Na_2S$ and 2400 pounds of $Na_2CO_3$, is processed to provide 7040 pounds per hour of first stage cooking liquor ($NaHSO_3$) and 3753 pounds per hour of second stage cooking liquor (510 pounds of $NaHCO_2$, 3235 pounds of $Na_2CO_3$ and 8 pounds of $Na_2S$). 7450 pounds per hour of furnace off-gas (line 15) is sent to gas scrubber 16 at a temperature of about 300° F. to provide 850 pounds per hour of make-up $CO_2$ recovered in tower 13.

In Table III and IV below, there are tabulated analyses of various liquid and gaseous processing streams, respectively, for the process route depicted in the drawing.

TABLE II
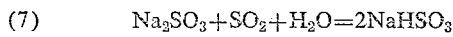
Operating Conditions

| Designation | Pressure, p.s.i.g. | Temperature, Top, °F. | Temperature Bottom, °F. |
|---|---|---|---|
| CO₂ Make-Up (13) | 0.5 | 95 | 123 |
| Gas Scrubber (16) | | 105 | 110 |
| Combination Tower (23) | 10 | 100 | 250 |
| Reactor (42) | 2 | 180 | 180 |
| Bisulfite Tower (30) | 0.5 | 110 | 120 |

TABLE III
Liquid Processing Streams

| Designation | Components (pounds/hr.) | | | | | | |
|---|---|---|---|---|---|---|---|
| | Na₂S | NaHS | Na₂CO₃ | NaHCO₃ | NaHSO₃ | Na₂SO₃ | H₂O |
| CO₂ Make-up Tower Feed (line 12) | 3,000 | | 2,400 | | | | 27,000 |
| Combination Tower Feed (line 22) | 1,700 | 800 | 2,700 | 1,200 | | | |
| Na₂CO₃ Storage Tank (line 35) | 15 | | 5,800 | 1,020 | | | |
| Reactor Feed (line 39) | 7 | | 3,235 | 510 | | | |
| Reactor Feed (line 41) | | | | | 7,040 | | |
| Bisulfite Tower Feed (line 47) | | | | | 1,150 | 1,280 | 6,860 |
| 1st Stage Liquors (line 51) | | | | | 7,040 | | |
| 2nd Stage Liquors (line 37) | 8 | | 3,235 | 510 | | | |

TABLE IV
Gaseous Processing Streams

| Designation—Gas | Components (pounds/hr.) | | | | | Operating Conditions | |
|---|---|---|---|---|---|---|---|
| | N₂ | O₂ | CO₂ | SO₂ | H₂S | Temp., °F. | Press., p.s.i.g. |
| Scrubber Feed (line 15) | 5,300 | 200 | 1,800 | 150 | | 300 | |
| CO₂ Make-up Feed (line 19) | 5,300 | 200 | 1,800 | 10 | | 105 | |
| CO₂ Make-up Off-gas (line 20) | 5,300 | 200 | 950 | | trace | 95 | |
| Combination Tower Feed (line 24) | | | 2,300 | | | | 15 |
| Combination Tower (line 25) | | | 1,140 | | 1,300 | 100 | 10 |

While we have shown and described a preferred form of our invention, we are aware that variations may be made thereto and we therefore, desire a broad interpretation of our invention within the scope of the disclosure herein and the following claims.

We claim:

1. A process for recovering the sodium values from a solution of smelted sodium base waste sulfite liquor which comprises: introducing said solution of smelted waste liquor including sodium sulfide and sodium carbonate into the upper section of a first contact zone; passing said solution through a contact with an off-gas including carbon dioxide and nitrogen whereby said liquor is partially carbonated to form a solution including sodium carbonate and sodium bicarbonate as said solution descends through said first contact zone, said contact being carried out at a pressure and temperature at which there is substantially no formation of hydrogen sulfide; withdrawing un-absorbed off-gas from said contact zone; withdrawing and introducing said partially carbonated solution into the upper section of a second contact zone; passing said partially carbonated solution through a contact with relatively pure carbon dioxide whereby said solution is carbonated to form hydrogen sulfide and a second solution including sodium carbonate and sodium bicarbonate as said solution descends through said second contact zone, said second contact being carried out at a pressure and temperature at which there is substantially no crystallization of said bicarbonate; heating said carbonated solution as it passes through the lower section of said second contact zone to decompose sodium bicarbonate included therein to form carbon dioxide and a solution comprised primarily of sodium carbonate, the carbon dioxide formed during said decomposition providing a portion of the relatively pure carbon dioxide contacting the partially carbonated solution; withdrawing hydrogen sulfide from said second contact zone; and withdrawing said sodium carbonate solution from said second contact zone as a sodium containing product solution recovered from said waste sulfite liquor.

2. A process for recovering the sodium values from a solution of smelted sodium base waste sulfite liquor which comprises: introducing said solution of smelted waste liquor including sodium sulfide and sodium carbonate into the upper section of a first contact zone; passing said solution through a contact with an off-gas including carbon dioxide and nitrogen whereby said liquor is partially carbonated to form a solution including sodium carbonate and sodium bicarbonate as said solution descends through said first contact zone, said contact being carried out at a pressure and temperature at which there is substantially no formation of hydrogen sulfide; withdrawing unabsorbed off-gas from said first contact zone; withdrawing and introducing said partially carbonated solution into the upper section of a second contact zone; passing said partially carbonated solution through a contact with relatively pure carbon dioxide whereby said solution is carbonated to form hydrogen sulfide and a second solution including sodium carbonate and sodium bicarbonate as said solution descends through said second contact zone, said second contact being carried out at a pressure and temperature at which there is substantially no crystallization of said bicarbonate; withdrawing and cooling a portion of said carbonated solution passing through said second contact zone; re-introducing said cooled portion of said carbonated solution at an intermediate point into said second contact zone to establish a temperature gradient within said contact zone thereby to improve said carbonation and the conversion of the sodium sulfide content of said solution of smelted waste liquor; heating said carbonated solution as it passes through the lower section of said second contact zone with heated vapor to decompose sodium bicarbonate included therein to form carbon dioxide and a solution comprised primarily of sodium carbonate, the carbon dioxide formed during said decomposition providing a portion of the relatively pure carbon dioxide contacting the partially carbonated solution; withdrawing hydrogen sulfide from said second contact zone; withdrawing said sodium carbonate solution from said second contact zone and introducing said solution into a reboil zone; heating said sodium carbonate solution in said reboil zone to form said heated vapor and to concentrate said sodium carbonate solution; introducing said heated vapor into said second contact zone; and withdrawing said concentrated sodium carbonate solution from said reboil zone as a sodium containing product solution recovered from said waste sulfite liquor.

3. A process for regenerating sodium base delignifying liquors in a two stage acid-alkali delignification of cellulosic material from a solution of smelted sodium base waste sulfite liquor which comprises: introducing said solution of smelted waste sulfite liquor including sodium sulfide and sodium carbonate into a first contact zone; passing said solution through a contact with an off-gas including carbon dioxide and nitrogen whereby said liquor is partially carbonated to form a solution including sodium carbonate and sodium bicarbonate, said contact being carried out at a pressure and temperature at which there is substantially no formation of hydrogen sulfide; withdrawing unabsorbed off-gas from said first contact zone; withdrawing and introducing said partially carbonated solution into a second contact zone; passing said partially carbonated solution through a contact with relatively pure carbon dioxide whereby said solution is carbonated to form hydrogen sulfide and a solution including sodium carbonate and sodium bicarbonate, said contact being carried out at a pressure and temperature at which there is substantally no crystallization of said bicarbonate; heating said carbonated solution as it passes through said second contact zone to decompose sodium bicarbonate included therein to form carbon dioxide and a solution comprised primarily of sodium carbonate, the carbon dioxide formed during said decomposition providing a portion of the relatively pure carbon dioxide contacting the partially carbonated solution of smelted waste liquor; withdrawing said sodium carbonate solution from said second contact zone and introducing a portion of said solution into a third contact zone; passing said sodium carbonate solution through a contact with a sodium bisulfite solution to form carbon dioxide and a solution comprised primarily of sodium sulfite, the carbon dioxide formed during said third contact providing a portion of the relatively pure carbon dioxide contacting the partially carbonated solution of smelted waste liquor; the remaining portion of said sodium carbonate solution constituting a sodium containing alkali delignification liquor; withdrawing hydrogen sulfide from said second contact zone and burning said hydrogen sulfide in the presence of a combustion supporting medium to form a gas including sulfur dioxide; withdrawing the solution comprised primarily of sodium sulfite from said third contact zone and introducing said solution into a fourth contact zone; passing said solution through a contact with said gas including sulfur dioxide whereby said solution is sulfonated to form a solution including sodium bisulfite; and withdrawing said sodium bisulfite solution from said fourth contact zone as a sodium containing acid delignification liquor, a portion of said solution providing the sodium bisulfite solution utilized for contacting said sodium carbonate solution in said third contact zone.

4. A process for regenerating sodium base delignifying liquor in a neutral sulfite semi-chemical delignification of cellulosic material from a solution of smelted sodium base waste sulfite liquor which comprises: introducing said solution of smelted waste sulfite liquor including sodium sulfide and sodium carbonate into a first contact zone; passing said solution through a contact with an off-gas including carbon dioxide and nitrogen whereby said liquor is partially carbonated to form a solution including sodium carbonate and sodium bicarbonate, said contact being carried out at a pressure and temperature at which there is substantially no formation of hydrogen sulfide; withdrawing un-absorbed off-gas from said first contact zone; withdrawing and introducing said partially carbonated solution into a second contact zone; passing said partially carbonated solution through a contact with relatively pure carbon dioxide whereby said solution is carbonated to form hydrogen sulfide and a solution including sodium carbonate and sodium bicarbonate, said contact being carried out at a pressure and temperature at which there is substantially no crystallization of said bicarbonate; heating said carbonated solution as it passes through said second contact zone to decompose the sodium bicarbonate included therein to form carbon dioxide and a solution comprised primarily of sodium carbonate, the carbon dioxide formed during said decomposition providing a portion of the relatively pure carbon dioxide contacting the partially carbonated solution of smelted waste liquor; withdrawing said sodium carbonate solution from said second contact zone and introducing said solution into a third contact zone; passing said sodium carbonate solution through a contact with a sodium bisulfite solution to form carobn dioxide and a solution comprised primarily of sodium sulfite, the carbon dioxide formed during said third contact providing a portion of the relatively pure carbon dioxide contacting the partially carbonated solution of smelted waste liquor; withdrawing hydrogen sulfide from said second contact zone and burning said hydrogen sulfide in the presence of a combustion supporting medium to form a gas including sulfur dioxide; withdrawing the solution primarily comprised of sodium sulfite from said third contact zone and introducing a portion of the solution into a fourth contact zone; passing said portion through a contact with said gas including sulfur dioxide whereby said solution is sulfonated to form a solution including sodium bisulfite, said sodium bisulfite solution providing the sodium bisulfite solution utilized for contacting said sodium carbonate solution in said third contact zone, the remaining portion of the sodium sulfite solution constituting a sodium containing product solution recovered from said waste sulfite liquor.

References Cited in the file of this patent
UNITED STATES PATENTS

| | | |
|---|---|---|
| 2,675,297 | Gray et al. | Apr. 13, 1954 |
| 2,798,883 | Cook | Apr. 23, 1957 |
| 2,800,388 | Ahlborg et al. | July 23, 1957 |
| 2,824,071 | Gray et al. | Feb. 18, 1958 |
| 2,864,669 | Ahlborg et al. | Dec. 16, 1958 |

OTHER REFERENCES

T. T. Collins, Jr., and R. H. Collins (Sodium Base Sulfite Recovery as Related to the Semichemical Process) reprinted from Southern Pulp and Paper Manufacturer, January 10, 1956, 12 pages.